(12) United States Patent
Wasnik et al.

(10) Patent No.: US 12,039,024 B2
(45) Date of Patent: Jul. 16, 2024

(54) LIVENESS DETECTION USING AUDIO-VISUAL INCONSISTENCIES

(71) Applicant: Rakuten Group, Inc., Tokyo (JP)

(72) Inventors: Pankaj Wasnik, Tokyo (JP); Yeongnam Chae, Tokyo (JP)

(73) Assignee: Rakuten, Inc., Tokyo (JP)

( * ) Notice: Subject to any disclaimer, the term of this patent is extended or adjusted under 35 U.S.C. 154(b) by 202 days.

(21) Appl. No.: 17/312,762

(22) PCT Filed: Mar. 24, 2020

(86) PCT No.: PCT/IB2020/052781
§ 371 (c)(1),
(2) Date: Jun. 10, 2021

(87) PCT Pub. No.: WO2021/191659
PCT Pub. Date: Sep. 30, 2021

(65) Prior Publication Data
US 2022/0318349 A1    Oct. 6, 2022

(51) Int. Cl.
*G06F 21/32* (2013.01)
*G06V 10/82* (2022.01)
(Continued)

(52) U.S. Cl.
CPC ............. *G06F 21/32* (2013.01); *G06V 10/82* (2022.01); *G06V 20/46* (2022.01); *G06V 40/174* (2022.01);
(Continued)

(58) Field of Classification Search
CPC . G06F 21/32; G06F 2221/2103; G06V 10/82; G06V 20/46; G06V 40/174;
(Continued)

(56) References Cited

U.S. PATENT DOCUMENTS

| | | | |
|---|---|---|---|
| 9,548,048 B1* | 1/2017 | Solh | G06V 40/20 |
| 2013/0275164 A1* | 10/2013 | Gruber | G10L 17/22 |
| | | | 705/5 |

(Continued)

FOREIGN PATENT DOCUMENTS

| | | |
|---|---|---|
| EP | 3 156 978 A1 | 4/2017 |
| WO | 2020/044052 A1 | 3/2020 |

OTHER PUBLICATIONS

Nicolas Eveno et al., "A Speaker independent "Liveness" Test for Audio-Visual Biometrics," Laboratoire CLIPS, 2005 (4 pages total).

(Continued)

*Primary Examiner* — Quazi Farooqui
(74) *Attorney, Agent, or Firm* — Sughrue Mion, PLLC

(57) ABSTRACT

Provided are a method and system for verifying a liveness detection of a user. The method includes: obtaining a video of a user speaking a phrase in response to a question or a randomly generated phrase presented to the user; inputting video data and audio data of the obtained video to a first determination model to obtain a first determination indicative of whether a mouth movement of the user is synchronized with the audio data; inputting, to a second determination model, a first input corresponding to the audio data and a second input corresponding to a predetermined phrase, to obtain a second determination indicative of whether the predetermined phrase is spoken by the user; and determining whether the first determination indicates that the mouth movement is synchronized with the audio data and whether the second determination indicates that the predetermined phrase is spoken by the user.

23 Claims, 10 Drawing Sheets

(51) Int. Cl.
  *G06V 20/40*     (2022.01)
  *G06V 40/16*     (2022.01)
  *G06V 40/40*     (2022.01)
  *G10L 17/24*     (2013.01)

(52) U.S. Cl.
  CPC .............. *G06V 40/40* (2022.01); *G10L 17/24* (2013.01); *G06F 2221/2103* (2013.01)

(58) Field of Classification Search
  CPC ......... G06V 40/40; G10L 17/24; G10L 17/04; G10L 17/18
  See application file for complete search history.

(56) References Cited

U.S. PATENT DOCUMENTS

| | | |
|---|---|---|
| 2016/0350611 A1 | 12/2016 | Zhang |
| 2019/0005976 A1* | 1/2019 | Peleg ...................... G10L 25/30 |
| 2019/0013026 A1 | 1/2019 | Feng et al. |
| 2021/0134312 A1* | 5/2021 | Koishida ................ G06V 20/46 |

OTHER PUBLICATIONS

Girija Chetty et al., ""Liveness" Verification in Audio-Video Authentication," INTERSPEECH 2004—iCSLP, 8th International Conference on Spoken Language Processing, ISCA Archive, Oct. 4-8, 2004 (4 pages total).

* cited by examiner

LIVENESS DETECTION USING AUDIO-VISUAL INCONSISTENCIES

BACKGROUND

1. Field

The disclosure relates to user identity authentication and, more particular, liveness detection using audio-visual consistency checks for authenticating a user's identity.

2. Description of Related Art

Electronic Know Your Customer (eKYC) procedures are used in various industries, such as banking, insurance, hotel, financial services, payment based services, etc., to identify and verify a customer's identity. Related art eKYC schemes typically employ biometric verification systems. As shown in FIG. 1, the biometric verification system includes two stages: an enrollment stage in which a biometric feature of a user is mapped to the user in a database; and a verification stage in which the biometric feature of the user is extracted by a sensor and compared to features previously registered in the database in order to authenticate the user.

Related art biometric systems, however, are vulnerable to various types of presentation attacks, i.e., fraudulent presentations to a biometric capture subsystem (e.g., biometric sensor) with the goal of deceiving or otherwise interfering with the operation of the biometric system. For example, artefacts that artificially represent a copy of a biometric characteristic may be presented to biometric systems to spoof a registered user and authenticate an attacker.

Presentation attacks include two-dimensional (2D) attacks, three-dimensional (3D) attacks, and voice attacks. 2D attacks include print attacks in which a printed photograph of a registered user (e.g., face image) or an artefact of a registered user's biometric feature (e.g., fake fingerprint) is presented, display attacks in which an image of a registered user is presented via a display device such as a mobile phone, and video attacks in which a video of a registered user is presented. Meanwhile, 3D attacks include mask attacks in which a wearable printed or silicone 3D mask is worn by an attacker or a 3D artefact of a user's biometric feature (e.g., a fake iris) is worn or otherwise presented by an attacker to spoof a registered user.

Related art eKYC schemes employ various presentation attack detection mechanisms to automatically determine and prevent a presentation attack. Such mechanisms include a facial detection by depth map analysis that creates a 3D facial depth map for verifying a user, a remote photoplethysmography (rPPG) method that verifies a user based on heart rate or cardiac monitoring, and thermal imaging-based facial liveness detection that verifies a user based on a real-time thermal image. These mechanisms, however, have various drawbacks. For example, the 3D facial depth analysis and thermal imaging-based facial liveness detection both incur excessive cost and complexity resulting from additional required sensors (e.g., a thermal camera). Further, the rPPG method requires a large amount of time and has relatively low accuracy.

SUMMARY

Provided are a liveness detection verification method and system for verifying an audio visual similarity check of a user based on a random phrase challenge.

Also provided are a liveness detection verification method and system that includes a speech recognition machine learning model to verify a detection result of an audio visual similarity detection machine learning model, based on a random phrase challenge.

Also provided are a method and system for training an audio visual similarity detection machine learning model and a speech recognition machine learning model used to authenticate a user in eKYC applications.

According to an aspect of an embodiment, there is provided a method of verifying a liveness detection by at least one processing device, the method including: obtaining a video of a user speaking a phrase in response to a question or a randomly generated phrase presented to the user; processing the video to obtain video data and audio data of the user; inputting the obtained video data and the obtained audio data to a first determination model to obtain a first determination indicative of whether a mouth movement of the user is synchronized with the audio data; inputting, to a second determination model, a first input corresponding to the audio data and a second input corresponding to a predetermined phrase, to obtain a second determination indicative of whether the phrase spoken by the user corresponds to the predetermined phrase; and determining whether the first determination indicates that the mouth movement is synchronized with the audio data and whether the second determination indicates that the predetermined phrase is spoken by the user, to verify a liveness detection of the user.

The method may further include randomly generating, from a pre-stored vocabulary set, the randomly generated phrase for presentation to the user, wherein the obtaining the video may include obtaining the video of the user speaking the phrase in response to the randomly generated phrase being presented, wherein the predetermined phrase may be the randomly generated phrase, wherein the pre-stored vocabulary set may include predetermined terms for each of a predetermined number of categories, and wherein the randomly generated phrase may include a combination of one term randomly selected from each of the predetermined number of categories.

The obtaining the video may include: transmitting, to a user device, one of the question and the randomly generated phrase; and receiving, from the user device, the video of the user speaking the phrase in response to the one of the question and the randomly generated phrase being presented to the user via the user device.

The processing the video may include: obtaining, from the video, an audio stream and a video stream; obtaining a first predetermined number of batches of a second predetermined number of frames of the video data, the frames of the video data including a cropped mouth region generated from the video stream; and obtaining the first predetermined number of batches of the second predetermined number of frames of the audio data, the frames of the audio data including mel-scaled spectrograms generated from the audio stream.

The inputting the obtained video data and the obtained audio data to the first determination model may include: inputting the obtained video data to a first machine learning neural network, and inputting the obtained audio data to a second machine learning neural network; and obtaining, as the first determination, a contrastive loss value corresponding to a distance between features from an output of the first machine learning neural network and an output of the second machine learning neural network.

The inputting to the second determination model may include: inputting, to a third machine learning neural network, the first input and the second input, the first input being features extracted from the output of the second machine learning neural network, and the second input being a character alignment or a word alignment of the predetermined phrase; and obtaining, as the second determination, a connectionist temporal classification (CTC) loss value.

The determining whether the first determination indicates that the mouth movement is synchronized with the audio data and whether the second determination indicates that the predetermined phrase is spoken by the user may include: determining that the user has not correctly spoken the predetermined phrase based on the contrastive loss value being less than a predetermined threshold; determining that the user has not correctly spoken the predetermined phrase based on the predetermined phrase not corresponding to predicted labels obtained from the CTC loss value; and determining that the user has correctly spoken the predetermined phrase based on both the contrastive loss value being greater than the predetermined threshold and the predicted labels corresponding to the predetermined phrase.

According to an aspect of another embodiment, there is provided a liveness detection verification system, including: a memory configured to store instructions; and at least one processor configured to execute the instructions to: obtain a video of a user speaking a phrase in response to a question or a randomly generated phrase presented to the user; process the video to obtain video data and audio data of the user; input the obtained video data and the obtained audio data to a first determination model to obtain a first determination indicative of whether a mouth movement of the user is synchronized with the audio data; input, to a second determination model, a first input corresponding to the audio data and a second input corresponding to a predetermined phase, to obtain a second determination indicative of whether the phrase spoken by the user corresponds to the predetermined phrase; and determine whether the first determination indicates that the mouth movement is synchronized with the audio data and whether the second determination indicates that the predetermined phrase is spoken by the user, to verify a liveness detection of the user.

The at least one processor may be further configured to execute the instructions to randomly generate, from a pre-stored vocabulary set, the randomly generated phrase for presentation to the user; the obtained video may be the video of the user speaking the phrase in response to the randomly generated phrase being presented; the predetermined phrase may be the randomly generated phrase; the pre-stored vocabulary set may include predetermined terms for each of a predetermined number of categories; and the randomly generated phrase may include a combination of one term randomly selected from each of the predetermined number of categories.

The liveness detection verification system may further include: a communication interface, wherein the at least one processor may be further configured to execute the instructions to: control the communication interface to transmit, to a user device, one of the question and the randomly generated phrase; and receive, from the user device via the communication interface, the video of the user speaking the phrase in response to the one of the question and the randomly generated phrase being presented to the user via the user device.

The at least one processor may be further configured to execute the instructions to: obtain, from the video, an audio stream and a video stream; obtain a first predetermined number of batches of a second predetermined number of frames of the video data, the frames of the video data including a cropped mouth region generated from the video stream; and obtain the first predetermined number of batches of the second predetermined number of frames of the audio data, the frames of the audio data including mel-scaled spectrograms generated from the audio stream.

The at least one processor may be further configured to execute the instructions to: input the obtained video data to a first machine learning neural network, and input the obtained audio data to a second machine learning neural network; and obtain, as the first determination, a contrastive loss value corresponding to a distance between features from an output of the first machine learning neural network and an output of the second machine learning neural network.

The at least one processor may be further configured to execute the instructions to: input, to a third machine learning neural network, the first input and the second input, the first input being features extracted from the output of the second machine learning neural network, and the second input being a character alignment or a word alignment of the predetermined phrase; and obtain, as the second determination, a connectionist temporal classification (CTC) loss value.

The at least one processor may be further configured to execute the instructions to: determine that the liveness detection is not verified based on the contrastive loss value being less than a predetermined threshold; determine that the liveness detection is not verified based on the predetermined phrase not corresponding to predicted labels obtained from the CTC loss value; and determine that the user has correctly spoken the predetermined phrase based on both the contrastive loss value being greater than the predetermined threshold and the predicted labels corresponding to the predetermined phrase.

According to an aspect of another embodiment, there is provided a non-transitory computer-readable medium storing instructions that, when executed by one or more processors, cause the one or more processors to: obtain a video of a user speaking a phrase in response to a question or a randomly generated phrase presented to the user; process the video to obtain video data and audio data of the user; input the obtained video data and the obtained audio data to a first determination model to obtain a first determination indicative of whether a mouth movement of the user is synchronized with the audio data; input, to a second determination model, a first input corresponding to the audio data and a second input corresponding to a predetermined phrase, to obtain a second determination indicative of whether the phrase spoken by the user corresponds to the predetermined phrase; and determine whether the first determination indicates that the mouth movement is synchronized with the audio data and whether the second determination indicates that the predetermined phrase is spoken by the user, to verify a liveness detection of the user.

The instructions, when executed by the one or more processors, may further cause the one or more processors to randomly generate, from a pre-stored vocabulary set, the randomly generated phrase for presentation to the user; the obtained video may be the video of the user speaking the phrase in response to the randomly generated phrase being presented; the predetermined phrase may be the randomly generated phrase; the pre-stored vocabulary set may include predetermined terms for each of a predetermined number of categories; and the randomly generated phrase may include a combination of one term randomly selected from each of the predetermined number of categories.

The instructions, when executed by the one or more processors, may further cause the one or more processors to: obtain, from the video, an audio stream and a video stream; obtain a first predetermined number of batches of a second predetermined number of frames of the video data, the frames of the video data including a cropped mouth region generated from the video stream; and obtain the first predetermined number of batches of the second predetermined number of frames of the audio data, the frames of the audio data including mel-scaled spectrograms generated from the audio stream.

The instructions, when executed by the one or more processors, may further cause the one or more processors to: input the obtained video data to a first machine learning neural network, and input the obtained audio data to a second machine learning neural network; and obtain, as the first determination, a contrastive loss value corresponding to a distance between features from an output of the first machine learning neural network and an output of the second machine learning neural network.

The instructions, when executed by the one or more processors, may further cause the one or more processors to: input, to a third machine learning neural network, the first input and the second input, the first input being features extracted from the output of the second machine learning neural network, and the second input being a character alignment or a word alignment of the predetermined phrase; and obtain, as the second determination, a connectionist temporal classification (CTC) loss value.

The instructions, when executed by the one or more processors, may further cause the one or more processors to: determine that the liveness detection is not verified based on the contrastive loss value being less than a predetermined threshold; determine that the liveness detection is not verified based on the predetermined phrase not corresponding to predicted labels obtained from the CTC loss value; and determine that the liveness detection is verified based on both the contrastive loss value being greater than the predetermined threshold and the predicted labels corresponding to the predetermined phrase.

According to an aspect of another embodiment, there is provided a method of training a liveness detection verification system, the method including: obtaining a video of a user speaking a phrase; processing the video to obtain video data and audio data of the user; and training a first machine learning model, for detecting audio-visual similarity, and a second machine learning model, for speech recognition, the first machine learning model trained based on the video data and the audio data, and the second machine learning model trained based on a predetermined phrase and a first input corresponding to the audio data, the predetermined phrase corresponding to one of a randomly generated phrase and an answer to a predetermined question.

The training may include simultaneously training the first machine learning model and the second machine learning model.

The first input corresponding to the audio data may include features extracted from a fully connected layer of the first machine learning model.

The training may include: inputting the video data and the audio data to the first machine learning model, to obtain a first determination indicative of whether a mouth movement of the user is synchronized with the audio data; inputting the first input corresponding to the audio data and a second input corresponding to the predetermined phrase to the second machine learning model, to obtain a second determination indicative of whether the phrase spoken by the user is the predetermined phrase.

The inputting the obtained video data and the obtained audio data to the first machine learning model may include: inputting the obtained video data to a first machine learning neural network, and inputting the obtained audio data to a second machine learning neural network; and obtaining, as the first determination, a contrastive loss value corresponding to a distance between features from an output of the first machine learning neural network and an output of the second machine learning neural network.

The inputting the first input and the second input to the second machine learning model may include: inputting, to a third machine learning neural network, the first input and the second input, the first input being features extracted from the output of the second machine learning neural network and the second input being a character alignment or a word alignment of the predetermined phrase; and obtaining, as the second determination, a connectionist temporal classification (CTC) loss value.

The training may include: inputting the video data and the audio data to the first machine learning model, to obtain a first determination indicative of whether a mouth movement of the user is synchronized with the audio data; inputting the first input corresponding to the audio data a second input corresponding to the predetermined phrase to the second machine learning model, to obtain a second determination indicative of whether the phrase spoken by the user is the predetermined phrase; aggregating the first determination and the second determination; and training the first machine learning model and the second machine learning model based on the aggregated determination.

Additional aspects will be apparent or set forth, at least in part, in the description that follows, or may be understood by practice of presented embodiments.

BRIEF DESCRIPTION OF THE DRAWINGS

These and/or other aspects will become apparent and more readily appreciated from the following description, taken in conjunction with the accompanying drawings in which.

DETAILED DESCRIPTION

Figure 1:
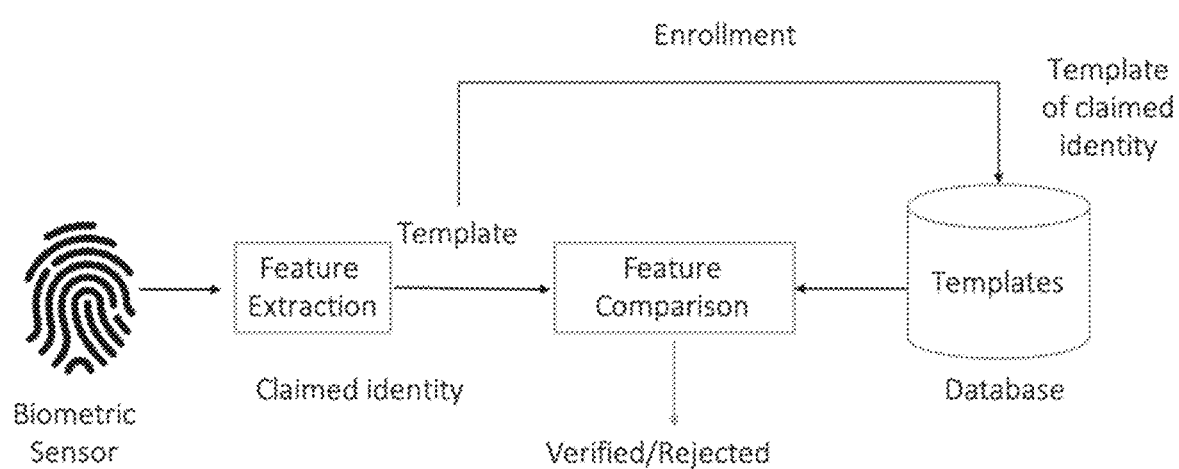
FIG. 1 is a flow diagram of a biometric verification system.

Hereinafter, exemplary embodiments of the disclosure will be described in detail with reference to the accompanying drawings in which like reference numerals refer to like elements throughout. It is understood, however, that the disclosure is not limited to embodiments described herein, and that features and components from one embodiment may be included or omitted in another embodiment.

Further, it is understood that as used herein, expressions such as "at least one of," when preceding a list of elements, modify the entire list of elements and do not modify the individual elements of the list. For example, the expressions "at least one of [A], [B], and [C]" or "at least one of [A], [B], or [C]" means only A, only B, only C, A and B, B and C, A and C, or A, B, and C.

It is also understood that, although the terms "first," "second," etc., may be used herein to describe various elements, these elements should not be limited by these terms (e.g., should not be interpreted as designating a relative order or significance). These terms are only used to distinguish one element from another.

Additionally, as used herein, the singular forms "a," "an" and "the" are intended to include the plural forms as well, unless otherwise indicated explicitly or by the surrounding context.

One or more embodiments of the present disclosure provide a liveness detection verification system and method for eKYC applications that can more reliably and effectively secure biometric authentication and prevent presentation attacks. In particular, a liveness detection verification method according to one or more embodiments includes a first determination that captures and compares audio and visual information of a user to determine a consistency of mouth movement with the audio (i.e., an audio visual similarity detection). To further prevent against presentation attacks (such as video attacks), the liveness detection verification method utilizes a random phrase (e.g., generates a random phrase at the time of authentication), and includes an additional consistency check (second determination) to confirm that the random phrase is spoken and thereby verify the liveness detection. By using a random phrase and incorporating a speech recognition to confirm that the phrase is spoken, a user is required to speak in real time thereby precluding use of a previously recorded or tampered video.

The first determination, i.e., the audio visual similarity detection, according to one or more embodiments may utilize a first machine learning model (e.g., a neural network, deep learning model, convolutional neural network (CNN), etc.) to determine a first probability that the mouth movement is in synch with the audio (e.g., a probability of a first degree of coincidence between the mouth movement and the audio). Additionally, the second determination, i.e., the speech recognition, may utilize a second machine learning model (e.g., a neural network, deep learning model, artificial recurrent neural network, long short-term memory (LSTM) network, etc.) to determine a second probability that the random phrase is spoken by the user (e.g., a probability of a second degree of coincidence between the audio and the random phrase). Accordingly, when both the first probability and the second probability exceed a threshold (e.g., if a combined loss is below a predetermined value or satisfies one or more predetermined conditions), the liveness detection of the user is verified.

An eKYC application (e.g., an online authentication system) that incorporates the liveness detection verification system and method according to one or more embodiments may further include additional measures to authenticate the user, such as a facial recognition. Here, the facial recognition may be separately performed, e.g., by capturing an additional image before or after the liveness detection is verified, or may be performed using an image obtained from the video captured for the liveness detection. It is understood that the facial recognition is but one example of a biometric authentication, and one or more other embodiments may utilize other biometric authentication schemes to authenticate the user, such as a fingerprint detection, an iris scan, etc.

Figure 2:
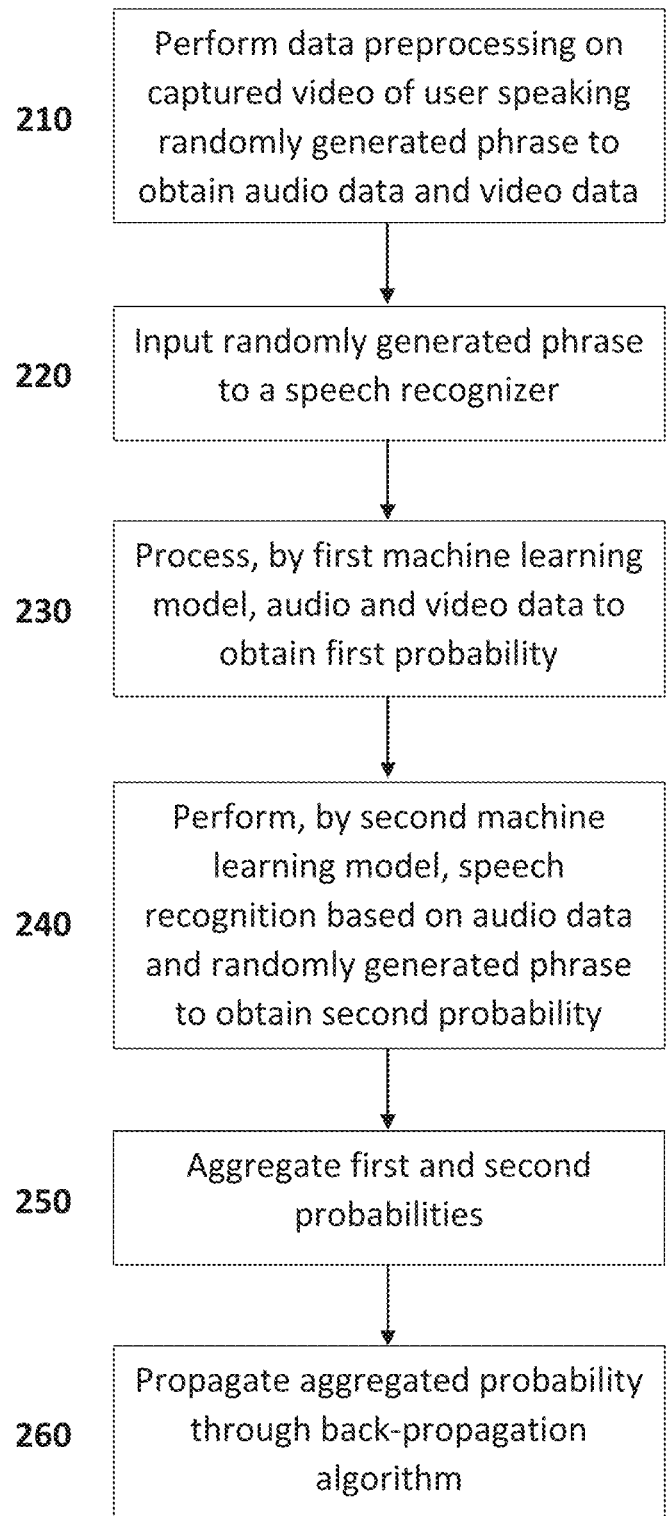
FIG. 2 is a flowchart of a training method for training the first machine learning model and the second machine learning model according to an embodiment.
Figure 3:
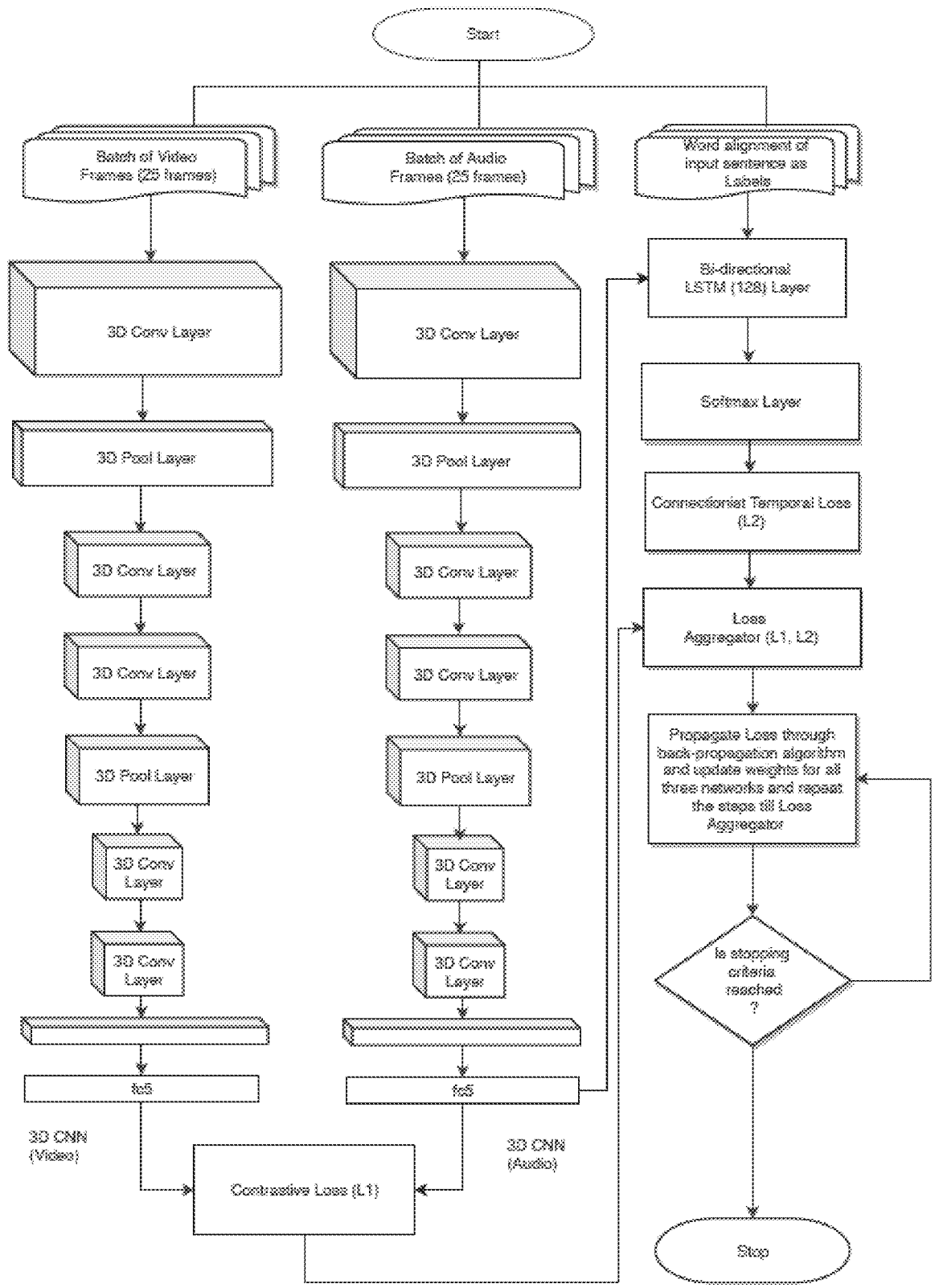
FIG. 3 is a flowchart of an implementation example of the training method according to an embodiment.

FIG. 2 is a flowchart of a training method for training the first machine learning model and the second machine learning model according to an embodiment, and FIG. 3 is a flowchart of an implementation example of the training method according to an embodiment.

Referring to FIG. 2, data preprocessing is performed on a captured video of a user speaking a randomly generated phrase in operation 210. The data preprocessing is performed to obtain video data (e.g., video frames) and audio data (e.g., audio frames), corresponding to the randomly generated phrase, for input to the first machine learning model. For example, the first machine learning model may include a 3D CNN for the video data and a 3D CNN for the audio data, as shown in the example of FIG. 3. A detailed description of the data preprocessing is provided below with reference to FIG. 7.

While the present embodiment is described with reference to a randomly generated phrase, it is understood that one or more other embodiments are not limited thereto. For example, according to another embodiment, the data preprocessing is performed on a captured video of the user speaking a phrase that corresponds to an answer to a predetermined question.

In operation 220, the randomly generated phrase is input to a speech recognizer (e.g., speech recognition engine, speech recognition processor, etc.) that includes the second machine learning model (e.g., a recurrent neural network). For example, a character or word alignment of the randomly generated phrase may be input to the speech recognizer as labels for determining a loss (e.g., connectionist temporal classification (CTC) loss). It is understood that operations 210 and 220 may be performed simultaneously, substantially simultaneously, or sequentially (e.g., with operation 210 at least partially or fully preceding or proceeding operation 220).

As set forth above, while the present embodiment is described with reference to a randomly generated phrase, it is understood that one or more other embodiments are not limited thereto. For example, according to another embodiment, a predetermined phrase that corresponds to an answer to a predetermined question is input to the speech recognizer In this case, a character or word alignment of the predetermined phrase may be input to the speech recognizer as labels for determining a loss (e.g., CTC loss).

In operation 230, the first machine learning model processes the video data and the audio data to obtain a first probability that a mouth movement is in synch with the audio (e.g., a probability of a first degree of coincidence between the mouth movement and the audio). For example, the first probability may be a contrastive loss value based on a measured distance between features from a fully connected layer of the 3D CNN for the video data and a fully connected layer of the 3D CNN for the audio data. A contrastive loss function ($L_1(Y, X)$) according to an embodiment may be in accordance with Equation 1 below:

$$L_1(Y, X) = \frac{1}{N}\sum_{i=1}^{N} L_C(Y_i, (X_{vid}, X_{aud})_i) \quad [\text{Equation 1}]$$

where $$L_W\left(Y_i(X_{p_1}, X_{p_2})_i\right) =$$

$$Y \times L_{gen}\left(D_W(X_{p_1}, X_{p_2})_i\right) + (1-Y) \times L_{imp}\left(D_W(X_{p_1}, X_{p_2})_i\right) + \lambda\|W\|_2,$$

and $$\begin{cases} L_{gen}(D_W(X_{p_1}, X_{p_2})) = \frac{1}{2}D_W(X_{p_1}, X_{p_2})^2 \\ L_{imp}(D_W(X_{p_1}, X_{p_2})) = \frac{1}{2}\max\{0, (\mu - D_W(X_{p_1}, X_{p_2}))\}^2 \end{cases},$$

where: $L_1$ corresponds to the Contrastive Loss; $X_{vid}$ corresponds to the input to network 1 (video network), video frame data and (n×W×H) is the shape of input data; $X_{aud}$ corresponds to the input to network 2 (audio network), audio frames data and (n×W×H) is the shape of input data; ($X_{vid}$, $X_{aud}$)$_i$ corresponds to the i-th input pair; $Y_i$ is corresponding label (1—Genuine pair, i.e., when the frames ($X_{vid}$, $X_{aud}$) are from same identity and 0—Impostor pair i.e. when frames ($X_{vid}$, $X_{aud}$) are from different identities); N is the number of training samples; $D_C$ is the Euclidean distance between outputs of FC layers of both networks with inputs $X_{vid}$ and $X_{aud}$; A is a regularization parameter; M is predefined margin; n corresponds to the number of frames; W corresponds to width of frame; and H corresponds to height of frame.

In operation 240, the second machine learning model processes audio data to perform a speech recognition based on the randomly generated phrase input in operation 220, to obtain a second probability that the random phrase is spoken by the user. The second probability may be a CTC loss value. According to an embodiment, the second machine learning model may receive audio data output from the first machine learning model for performing the speech recognition. For example, the second machine learning model may receive a fully connected layer (or features thereof) from a 3D CNN for the audio data of the first machine learning model, as well as labels for the character or word alignment of the randomly generated phrase. Based on these inputs, the second machine learning model may perform a speech recognition to obtain the CTC loss value.

As set forth above, while the present embodiment is described with reference to a randomly generated phrase, it is understood that one or more other embodiments are not limited thereto. For example, according to another embodiment, a predetermined phrase that corresponds to an answer to a predetermined question is input to the speech recognizer, for determining whether a phrase spoken by the user (i.e., the audio data) corresponds to the predetermined phrase. That is, according to another embodiment, the second machine learning model may receive a fully connected layer (or features thereof) from a 3D CNN for the audio data of the first machine learning model, as well as labels for the character or word alignment of the predetermined phrase. Based on these inputs, the second machine learning model may perform a speech recognition to obtain the CTC loss value.

In operation 250, the first probability (e.g., a contrastive loss value) and the second probability (e.g., a CTC loss value) are aggregated.

In operation 260, the aggregated probability (e.g., aggregated loss) is propagated through a back-propagation algorithm and weights for the first and second machine learning models (e.g., 3D CNN for the video data, 3D CNN for the audio data, and recurrent neural network) are updated. The training method may then be repeatedly performed until, for example, a stopping criteria is reached as shown in FIG. 3.

According to an embodiment, the first machine learning model and the second machine learning model are both trained from a same training dataset, in connection with each other as described above. Accordingly, the first machine learning model and the second machine learning model can be trained at the same time, thereby condensing and streamlining the training time as compared to a case in which machine learning models are separately trained. The trained models can subsequently be used for performing a liveness detection verification method, as described below with reference to FIGS. 4 to 6.

Figure 4:
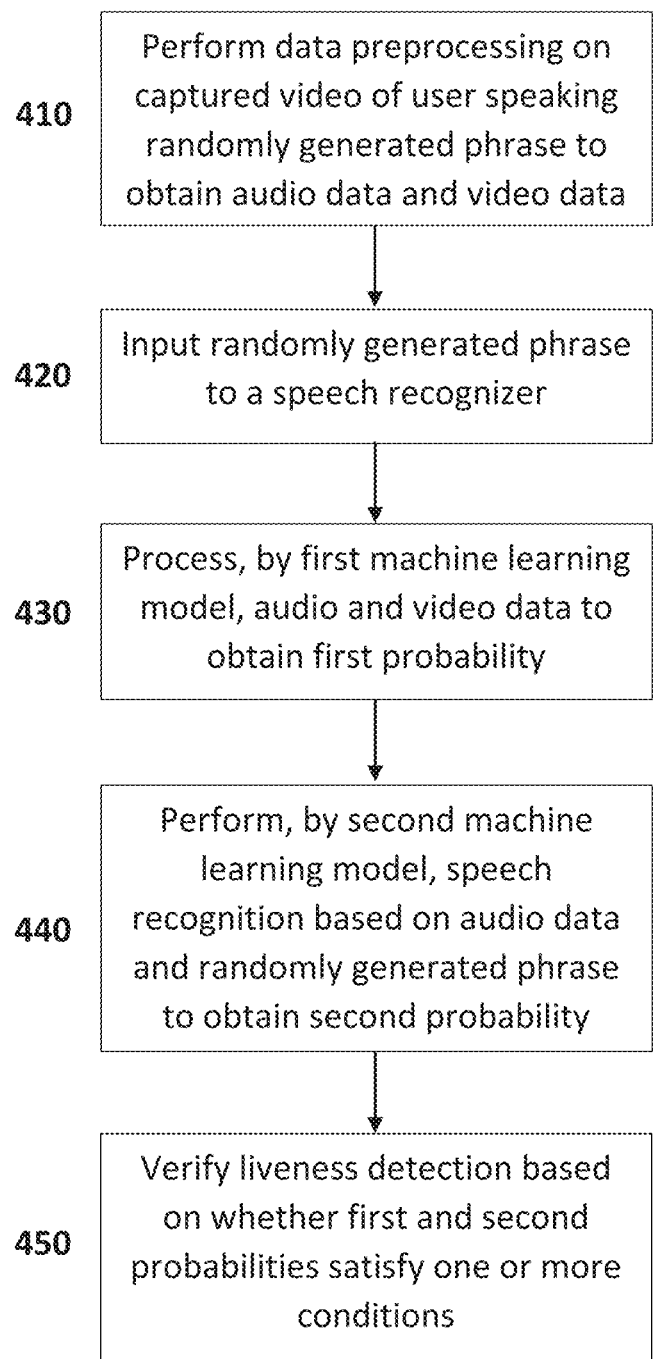
FIG. 4 is a flowchart of a liveness detection verification method according to an embodiment.
Figure 5:
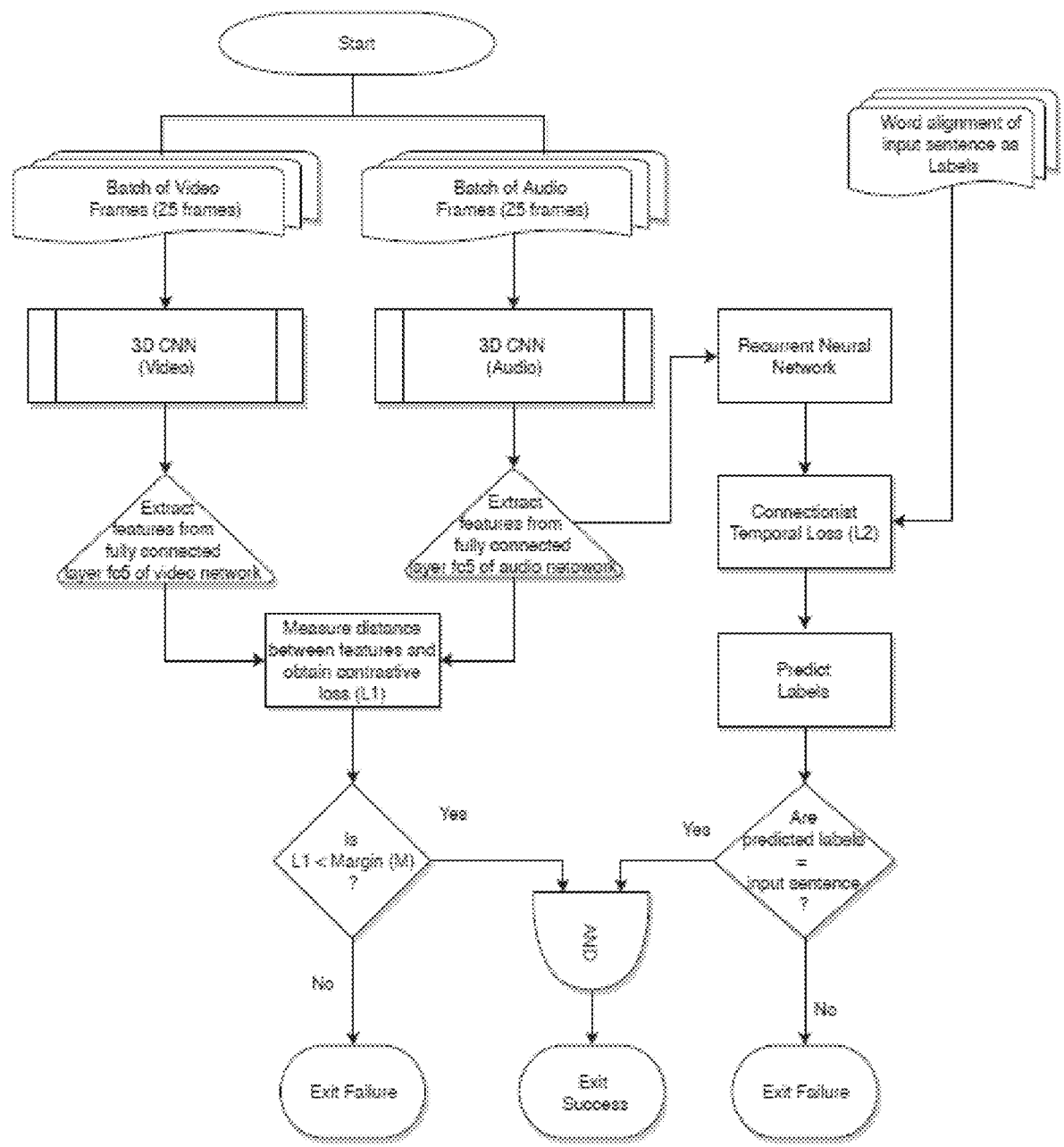
FIG. 5 is a flowchart of an implementation example of the liveness detection verification method according to an embodiment.
Figure 6:
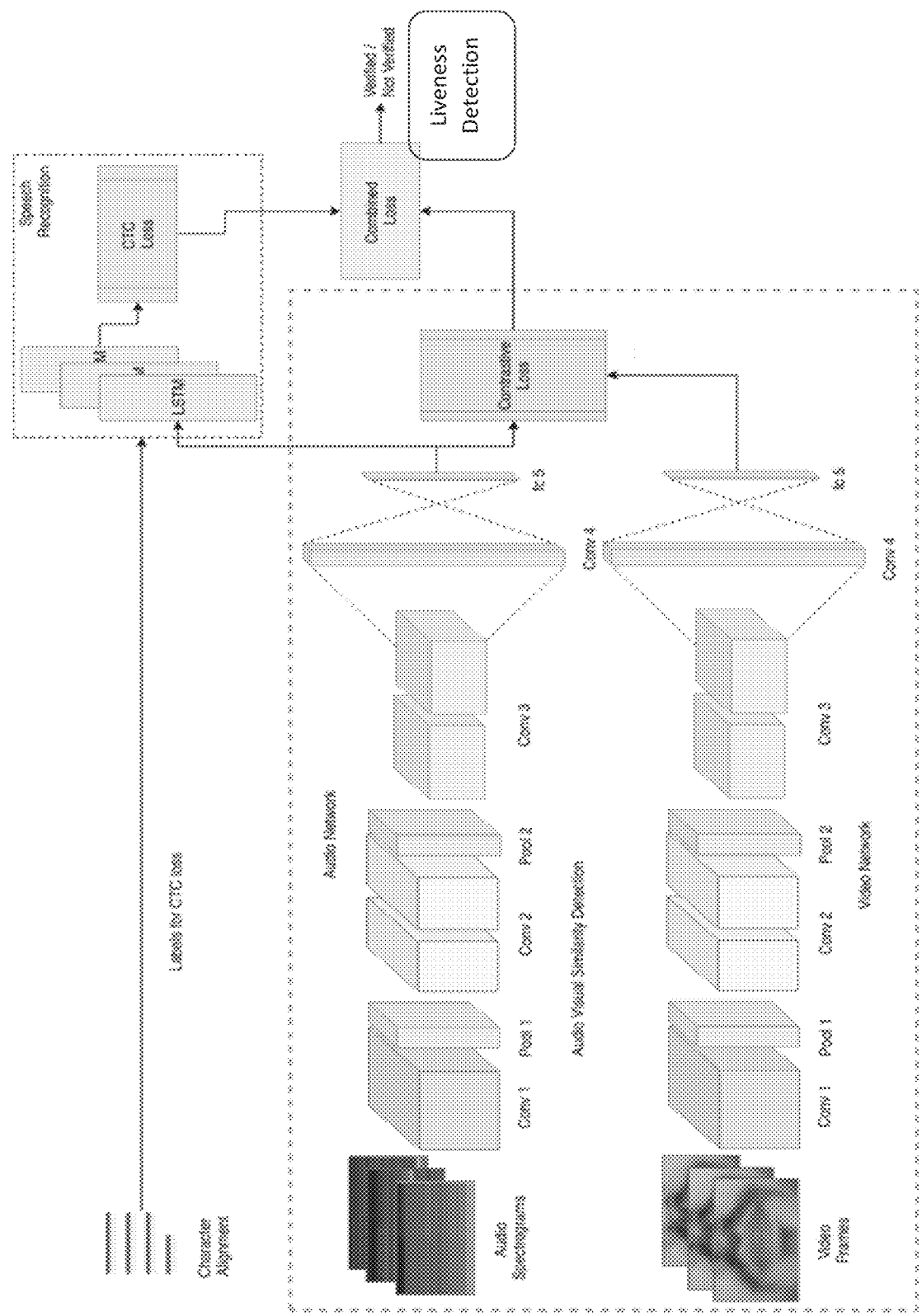
FIG. 6 is a flow diagram of an implementation example of the liveness detection verification method according to an embodiment.

FIG. 4 is a flowchart of a liveness detection verification method according to an embodiment, FIG. 5 is a flowchart of an implementation example of the liveness detection verification method according to an embodiment, and FIG. 6 is a flow diagram of an implementation example of the liveness detection verification method according to an embodiment. The liveness detection verification method may be performed in connection with an eKYC application, e.g., by a server for performing an online authentication of a user or customer.

Referring to FIG. 4, data preprocessing is performed in operation 410 to obtain video data (e.g., video frames) and audio data (e.g., audio frames or audio spectrograms as illustrated in FIG. 6), corresponding to a randomly generated phrase, for input to the first machine learning model of an audio visual similarity detector (e.g., audio visual similarity detection engine, audio visual similarity detection processor, etc.). As described above and shown in the examples of FIGS. 5 and 6, the first machine learning model may include a video network (e.g., a 3D CNN) for the video data and an audio network (e.g., a 3D CNN for the audio data). Further, the data preprocessing in operation 410 is the same as or substantially similar to that performed for training the machine learning models, i.e., operation 210 in FIG. 2.

In the data preprocessing, a randomly generated phrase is provided to be read by a user. For example, a first server may generate or otherwise obtain the phrase and transmit the same to a user device (e.g., a mobile phone, a personal computer, etc.) for display (e.g., via a web page, an application, a user interface, etc.) on a display of the user device. Subsequently, video data and audio data of the user reading the randomly generated phrase may be obtained. For example, the first server or a second server may receive, from the user device, a video (including video data and audio data) of the user reading the randomly generated phrase. The video may be captured by a camera or image sensor and a microphone of the user device. The received video is then preprocessed to obtain the video data (e.g., video frames) and audio data (e.g., audio frames or spectrograms as shown in FIG. 6). A detailed description of the data preprocessing is provided below with reference to FIG. 7.

While the present embodiment is described with reference to a randomly generated phrase, it is understood that one or more other embodiments are not limited thereto and any other predetermined phrase may be applied. For example, according to another embodiment, a predetermined question is presented to a user for display. Subsequently, video data and audio data of the user providing an answer to the question may be obtained. Accordingly, the first server or a second server may receive, from the user device, a video (including video data and audio data) of the user speaking an answer to the presented question. The received video is then preprocessed to obtain the video data (e.g., video frames) and audio data (e.g., audio frames or spectrograms as shown in FIG. 6).

In operation 420, the randomly generated phrase is input to a speech recognizer (e.g., speech recognition engine, speech recognition processor, etc.) that includes the second machine learning model (e.g., a recurrent neural network). For example, a character or word alignment of the randomly generated phrase may be input to the speech recognizer as labels for determining a loss (e.g., connectionist temporal classification (CTC) loss). It is understood that operations 410 and 420 may be performed simultaneously, substantially simultaneously, or sequentially (e.g., with operation 410 at least partially or fully preceding or proceeding operation 220).

As set forth above, while the present embodiment is described with reference to a randomly generated phrase, it is understood that one or more other embodiments are not limited thereto. For example, according to another embodiment, a predetermined phrase that corresponds to an answer to a predetermined question is input to the speech recognizer, for determining whether a phrase spoken by the user (i.e., the audio data) corresponds to the predetermined phrase. In this case, a character or word alignment of the predetermined phrase may be input to the speech recognizer as labels for determining a loss (e.g., CTC loss).

In operation 430, the first machine learning model processes the video data and the audio data to obtain the first probability that a mouth movement is in synch with the audio (e.g., a probability of a first degree of coincidence between the mouth movement and the audio). For example, the first probability may be a contrastive loss value based on a measured distance between features from a fully connected layer of the 3D CNN for the video data and a fully connected layer of the 3D CNN for the audio data, as shown in FIG. 5. A contrastive loss function according to an embodiment may be in accordance with Equation 1 described above with reference to FIG. 2.

In operation 440, the speech recognizer processes audio data to perform a speech recognition based on the randomly generated phrase input in operation 420, to obtain the second probability that the random phrase is spoken by the user. The second probability may be a CTC loss value. According to an embodiment, the second machine learning model may receive audio data output from the first machine learning model for performing the speech recognition. For example, the second machine learning model may receive a fully connected layer (or features extracted therefrom) of a 3D CNN for the audio data of the first machine learning model, as well as labels for the character or word alignment of the randomly generated phrase. Based on these inputs, the second machine learning model may perform a speech recognition to obtain the CTC loss value, as shown in FIGS. 5 and 6.

As set forth above, while the present embodiment is described with reference to a randomly generated phrase, it is understood that one or more other embodiments are not limited thereto. For example, according to another embodiment, a predetermined phrase that corresponds to an answer to a predetermined question is input to the speech recognizer, for determining whether a phrase spoken by the user (i.e., the audio data) corresponds to the predetermined phrase. That is, according to another embodiment, the second machine learning model may receive a fully connected layer (or features thereof) of a 3D CNN for the audio data of the first machine learning model, as well as labels for the character or word alignment of the predetermined phrase. Based on these inputs, the second machine learning model may perform a speech recognition to obtain the CTC loss value.

In operation 450, the liveness detection is verified based on whether the first prediction value and the second prediction value satisfy one or more conditions. As illustrated in FIG. 6, a combined loss determination based on the first prediction value (e.g., contrastive loss value) and the second prediction value (e.g., CTC loss value) may be performed to verify the liveness detection.

An example of the combined loss determination is shown in FIG. 5. Specifically, the contrastive loss value (L1) obtained from the first machine learning model is compared against a threshold value (e.g., a predetermined margin value (M)). If the contrastive loss is less than the threshold value, it is determined that the liveness detection is not verified. Further, the CTC loss value (L2) obtained from the second machine learning model is used to predict labels of the recognized speech. If the predicted labels do not correspond to the randomly generated phrase, it is determined that the liveness detection is not verified. Meanwhile, if both the contrastive loss value is greater than (or greater than or equal to) the threshold value and the predicted labels correspond to the randomly generated phrase, it is determined that the liveness detection is verified.

The method of FIG. 4 is repeated for each batch of video and audio data obtained from the data preprocessing of operation 410. For example, as illustrated in FIGS. 5 and 6, three batches of 25 frames of video and audio data each corresponding to one second of captured video are successively input to the first machine learning model.

A liveness detection verification method according to an embodiment as described above can more reliably secure biometric authentication and prevent presentation attacks by implementing a speech recognition to verify an audio visual similarity detection based on a randomly generated phrase (or a question randomly selected from among a plurality of predetermined (or frequently/periodically updated) questions). For example, by utilizing a random phrase (or the question) and incorporating a speech recognition to confirm that the phrase (or an answer to the question) is spoken, a user is required to speak in real time thereby precluding use of a previously recorded or tampered video.

Figure 7:
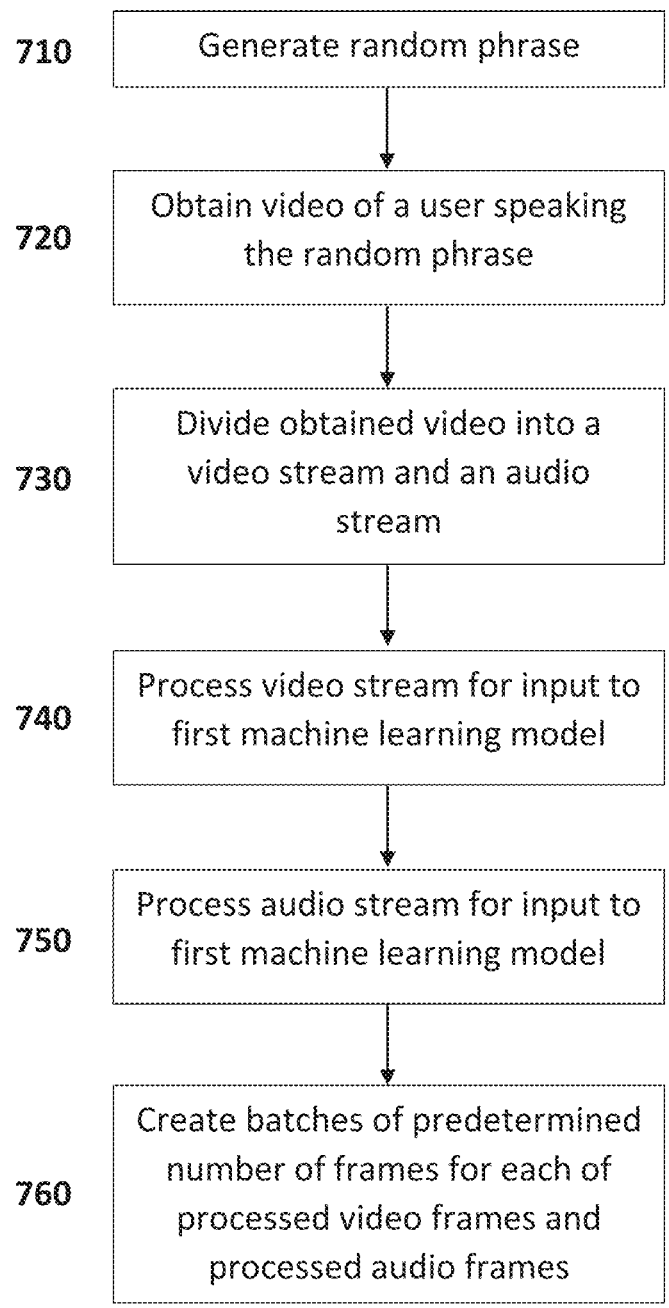
FIG. 7 is a flowchart of a data preprocessing method for a liveness detection verification system according to an embodiment.

FIG. 7 is a flowchart of a data preprocessing method for a liveness detection verification system according to an embodiment. The data preprocessing method of FIG. 7 can be implemented for either training the first machine learning model and/or the second machine learning model (i.e., operation 210 of FIG. 2) or for performing a liveness detection verification using previously trained first and second machine learning models (i.e., operation 410 of FIG. 4).

Referring to FIG. 7, in operation 710, a random phrase challenge is generated and provided to a user. For example, a phrase may be randomly generated from a pre-stored dictionary, vocabulary set, or database, and displayed to a user via a display. In one exemplary implementation, the vocabulary set may include a predetermined number of entries or candidate terms (e.g., words, letters, numbers, etc.) for each of a predetermined number of categories. An example of such a vocabulary set is shown in Table 1 below, and includes six categories: a command, a color, a preposition, a letter, a digit, and an adverb:

TABLE 1

| Command | Color | Preposition | Letter | Digit | Adverb |
|---------|-------|-------------|--------|-------|--------|
| Bin | blue | at | A-Z* | 0-9 | again |
| Lay | green | by | *excluding W | | now |
| Place | red | in | | | please |
| Set | white | with | | | soon |

Using the above vocabulary set as an example, a phrase such as "Place blue at F 9 now" or "Lay green by W 3 again" may be generated and provided (e.g., to a user device or customer terminal) for display on a screen. It is understood, however, that this is just one example, and one or more other embodiments are not limited to the vocabulary set as provided above and/or to six categories of candidate terms, and any number of candidate terms and categories may be implemented. Ultimately, by using a random phrase challenge with a large number of possible outputs, an attacker is prevented from spoofing a registered user via a previously recorded or tampered video.

While the present embodiment is described with reference to a random phrase, it is understood that one or more other embodiments are not limited thereto, and another predetermined phrase may be used. For example, a predetermined phrase that corresponds to an answer to a question may be applied. In this regard, the question may be among a plurality of predetermined questions that may be updated or changed from time to time to enhance security (by reducing the chance of prerecorded answers being successfully used by an attacker). According to another embodiment, the question (or the corresponding predetermined phrase/answer) may be presented to the user so as to obtain a video of the user speaking the answer.

Next, in operation 720, a video of a user speaking the presented random phrase challenge (or answer to predetermined question) is obtained. For example, a video of predetermined length (e.g., 3 seconds) is captured by a camera or image sensor and microphone once the random phrase challenge is presented, i.e., while the user is speaking the random word challenge.

In operation 730, the obtained video is divided into a video stream and an audio stream. For example, a demultiplexer or image processor demultiplexes the captured video into elementary video and audio streams.

In operation 740, the video stream is processed for input to the first machine learning model. The video stream may be processed for input to train the model (i.e., the method of FIG. 2) and/or to determine the consistency of the mouth movement with the audio (i.e., the method of FIG. 4). Here, the processing may include at least one of converting the video stream frame rate to a predetermined frame rate (e.g., 25 frames per second (fps)), and extracting a predetermined number of video frames (e.g., 75 video frames corresponding to 3 seconds) such that each frame corresponds to a predetermined length of time (e.g., 40 millisecond video). The processing may further include at least one of detecting mouth coordinates for each video frame, cropping the mouth region per the detected coordinates (or bounding box), and converting the cropped mouth region to gray scale or a single channel image and resizing to a predetermined size (e.g., 60×100 pixels).

In operation 750, the audio stream obtained in operation 730 is processed for input to the first machine learning model used to determine the consistency of mouth movement with audio. Here, the processing may include at least one of converting the audio to a single channel stream, changing a sample frequency to a predetermined frequency (e.g., 22.05 KHz), and extracting a predetermined number of non-overlapping frames (e.g., 75 non-overlapping frames corresponding to 3 seconds) such that each frame corresponds to a predetermined length of time (e.g., 40 millisecond audio). Further, to the extent that the data preprocessing of FIG. 7 is for training the liveness detection model, the processing of operation 750 may further include tampering the audio frames for input as a negative class of the training dataset (or not tampering for input as a positive class). The tampering may include modifying at least one of a tempo and a pitch of the audio frames. Of course, if the data preprocessing of FIG. 7 is not for training the liveness detection model, the tampering is omitted.

The processing of operation 750 may also include extracting a mel-scaled spectrogram for each audio frame. Like the video frames, the mel-scaled spectrogram may also be converted to gray scale or a single channel image.

It is understood that operations 740 and 750 may be performed simultaneously, substantially simultaneously, or sequentially (with operation 740 at least partially or fully preceding or proceeding operation 750).

In operation 760, batches of a predetermined number of frames (e.g., 25 frame batches corresponding to 1 second of data) may be created for each of the processed video frames and processed audio frames. For example, three batches of 25 frames of video and audio are generated in operation 760, and may be input to the first machine learning model.

The video and audio data (e.g., video frames and audio spectrograms as shown in FIGS. 3, 5, and 6) obtained in operation 760 are input to the first machine learning model to either train the model as described above with reference to FIGS. 2 and 3, or to perform an audio visual similarity detection and verification as described above with reference to FIGS. 4 to 6.

Figure 8:
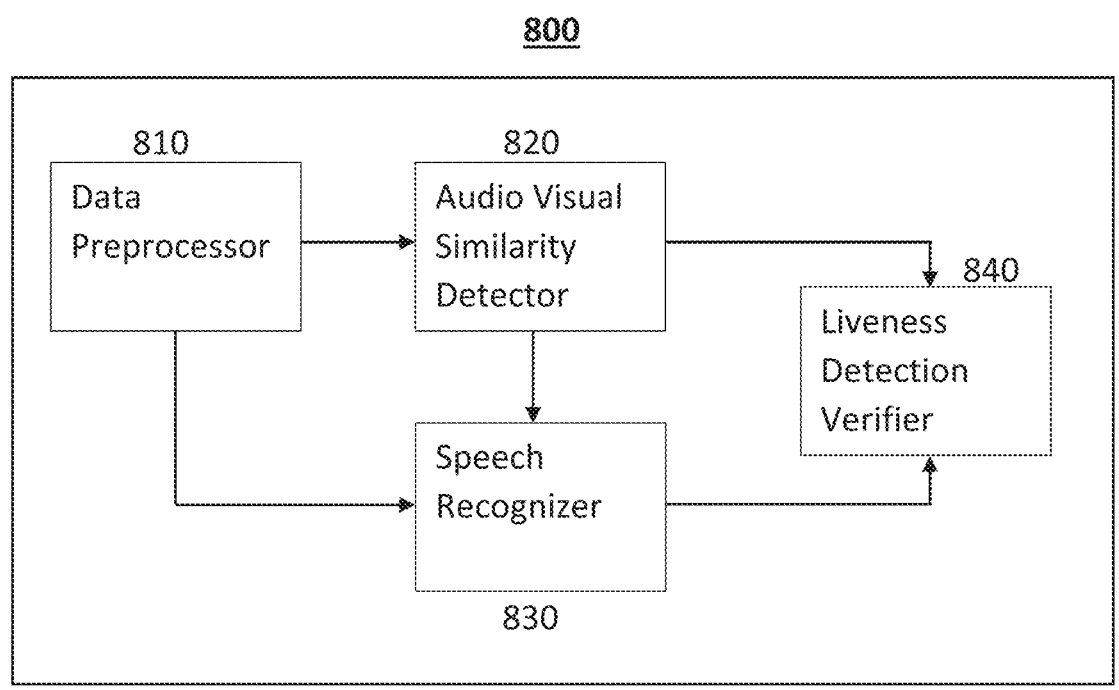
FIG. 8 is a block diagram of a liveness detection verification system according to an embodiment.

FIG. 8 is a block diagram of a liveness detection verification system 800 according to an embodiment. The liveness detection verification system 800 may be implemented in one or more servers (e.g., for an online authentication system), a user terminal (e.g., a customer terminal), or distributed across a user terminal and one or more servers.

Referring to FIG. 8, the liveness detection verification system 800 includes a data preprocessor 810, an audio visual similarity detector 820, a speech recognizer 830, and a liveness detection verifier 840.

The data preprocessor 810 obtains video data (e.g., video frames) and audio data (e.g., audio frames or audio spectrograms as illustrated in FIG. 6), corresponding to a randomly generated phrase. A detailed block diagram of the data preprocessor according to an embodiment is illustrated in FIG. 9.

Figure 9:
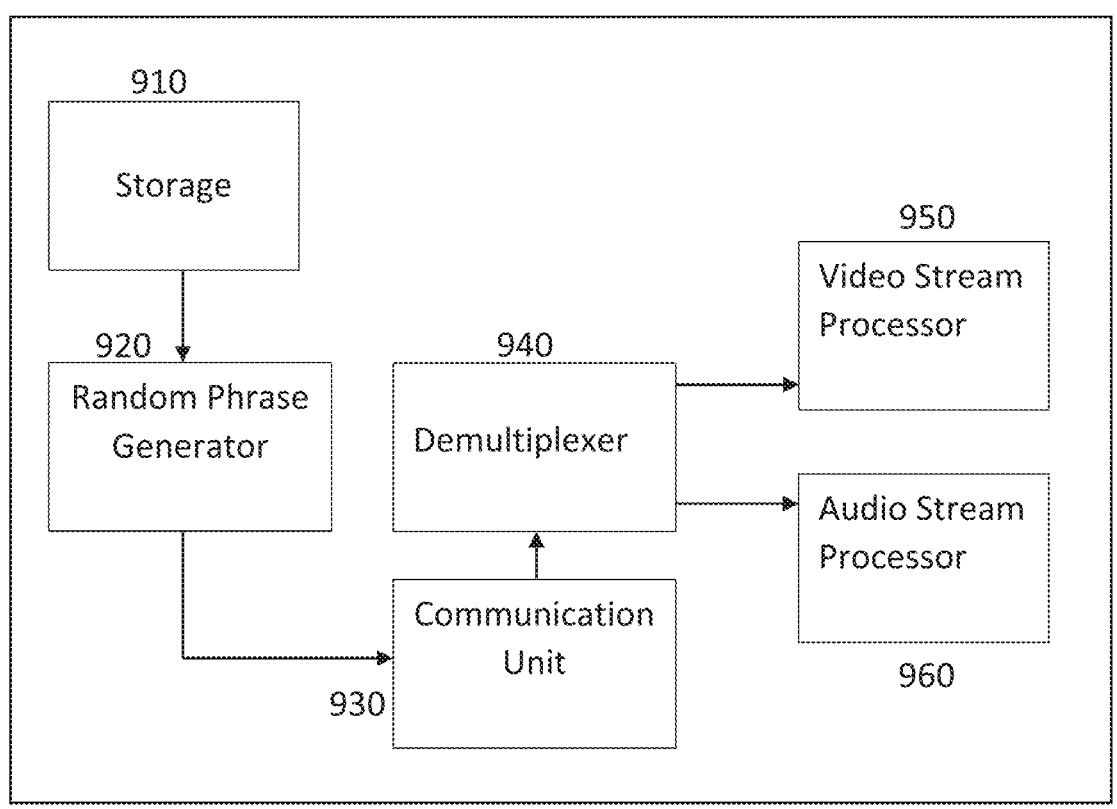
FIG. 9 is a block diagram of a data preprocessor for a liveness detection verification system according to an embodiment.

Referring to FIG. 9, the data preprocessor 810 includes a storage 910, a random phrase generator 920, a communication unit 930, a demultiplexor 940, a video stream processor 950, and an audio stream processor 960.

The storage 910 stores a vocabulary set as described above with reference to FIG. 7. For example, the vocabulary set may include a predetermined number of entries or candidate terms (e.g., words, letters, numbers, etc.) for each of a predetermined number of categories, as exemplified in Table 1 above. The storage 910 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Further, it is understood that the storage 910 may be provided in a distinct or separate device or server.

The random phrase generator 920 randomly generates a phrase from the vocabulary set. For example, the random phrase generator 920 may randomly combine one term from each of the categories of the vocabulary set to generate a phrase.

The communication unit 930 (e.g., communicator, communication interface, etc.) transmits the randomly generated phrase to a user terminal (e.g., a mobile phone, a personal computer, etc.) via at least one of a wired or wireless network (such as a cellular network, an Internet network, a fiber optic network, a Wi-Fi network, etc.). Further, the communication unit 930 receives, from the user terminal, a video of a user speaking the randomly generated phrase. Here, the video may be of a predetermined length (e.g., 3 seconds) and may be captured by a camera or image sensor and microphone of the user terminal once the random phrase challenge is presented, i.e., while the user is speaking the random word challenge.

It is understood that the communication unit 930 may provide the randomly generated phrase to a user and/or receive the captured video through a web server hosting a website of an online authentication service or consumer portal (e.g., a website for a financial institution). Further, it is understood that the communication unit 930 may be omitted where the data preprocessor 810 is used to train the first and second machine learning models, and/or where the data preprocessor 810 obtains the video of the user reading the randomly generated phrase locally (e.g., where the liveness detection verification system 800 is included in a user or customer terminal).

The demultiplexer 940 demultiplexes the obtained video into elementary video and audio streams.

The video stream processor 950 processes the video stream for input to the audio visual similarity detector 820, to train the model and/or to obtain a decision from the model. Here, the video processing may include at least one of converting the video stream frame rate to a predetermined frame rate (e.g., 25 frames per second (fps)), extracting a predetermined number of video frames (e.g., 75 video frames corresponding to 3 seconds) such that each frame corresponds to a predetermined length of time (e.g., 40 millisecond video), detecting mouth coordinates for each video frame, cropping the mouth region per the detected coordinates (or bounding box), converting the cropped mouth region to gray scale or a single channel image, and resizing the gray scale or single channel image to a predetermined size (e.g., 60×100 pixels).

Further, the video stream processor 950 obtains and outputs a predetermined number of batches of a predetermined number of frames of the gray scale or single channel images (e.g., 25 frame batches corresponding to 1 second of data). For example, three batches of 25 frames of video may be output by the video stream processor 950.

The audio stream processor 960 processes the audio stream for input to the audio visual similarity detector 820, to train the model and/or to obtain a decision from the model. Here, the audio processing may include at least one of converting the audio to a single channel stream, changing a sample frequency to a predetermined frequency (e.g., 22.05 KHz), and extracting a predetermined number of non-overlapping frames (e.g., 75 non-overlapping frames corresponding to 3 seconds) such that each frame corresponds to a predetermined length of time (e.g., 40 millisecond audio). Further, to the extent that the audio processing is for training the liveness detection model, the processing may further include tampering the audio frames for input as a negative class of the training dataset (or not tampering for input as a positive class).

The tampering may include modifying at least one of a tempo and a pitch of the audio frames.

The audio processing may also include at least one of extracting a mel-scaled spectrogram for each audio frame and converting the spectrograms to gray scale or single channel spectrograms.

Further, the audio stream processor 960 obtains and outputs a predetermined number of batches of a predetermined number of frames of the gray scale or single channel spectrograms (e.g., 25 frame batches corresponding to 1 second of data). For example, three batches of 25 frames may be output by the audio stream processor 960.

It is understood that one or more of the above-described components of the data preprocessor 810 may be implemented as circuitry, hardware, software, or a combination of hardware and software. Further, it is understood that one or more of the above-described components of the data preprocessor 810 may be implemented as software executable by at least one processor. Moreover, it is understood that one or more of the above-described components of the data preprocessor 810 may be distributed across a plurality of devices.

Referring back to FIG. 8, the audio visual similarity detector 820 obtains the video data (e.g., batches of video frames) and the audio data (e.g., batches of audio frames) output by the data preprocessor 810, i.e., the video stream processor 950 and the audio stream processor 960, and outputs a first determination value indicating whether the video data (e.g., the mouth movement in the video data) is in synch with the audio. Specifically, the audio visual similarity detector 820 includes a first machine learning model to obtain a first probability that a mouth movement is in synch with the audio (e.g., a probability of a first degree of coincidence between the mouth movement and the audio) for each corresponding batch of the video and audio data.

The first machine learning model may include a first neural network (e.g., 3D CNN) for the video data, a second neural network (e.g., 3D CNN) for the audio data, and a contrastive loss calculator. Here, the first neural network may output, to the contrastive loss calculator, a fully connected layer corresponding to the video data and the second neural network may output, to the contrastive loss calculator, a fully connected layer corresponding to the audio data. The contrastive loss calculator may measure a distance between features extracted from the fully connected layers of the first neural network and the second neural network (as shown in FIG. 5). A contrastive loss function according to an embodiment may be in accordance with Equation 1 described above with reference to FIG. 2.

Further, the audio visual similarity detector 820 may output audio data to the speech recognizer 830. For example, the audio visual similarity detector 820 may output the fully connected layer (or features thereof) of the audio data to the speech recognizer 830.

The speech recognizer 830 receives the randomly generated phrase from the data preprocessor 810 and the audio data from the audio visual similarity detector 820 and performs a speech recognition based thereon to output a second determination value. Specifically, the speech recognizer 830 processes the audio data to perform a speech recognition and determines whether the random phrase is spoken by the user (e.g., obtains as the second determination value a second probability that the random phrase is spoken by the user).

To this end, the speech recognizer 830 may include a second machine learning model (e.g., a recurrent neural network, a LSTM network, etc.). For example, the second machine learning model may receive, as inputs, a fully connected layer (or features extracted therefrom) of a 3D CNN for the audio data of the first machine learning model, as well as labels for the character or word alignment of the randomly generated phrase. Here, the labels for the character or word alignment of the randomly generated phrase may be obtained by the speech recognizer 830 for determining a loss (e.g., connectionist temporal classification (CTC) loss). The speech recognizer 830 may generate the labels for the character or word alignment or may obtain the labels from the data preprocessor 810. Based on these inputs, the second machine learning model may perform a speech recognition to obtain the second determination value (e.g., CTC loss value, as shown in FIGS. 5 and 6).

It is understood that the first machine learning model and the second machine learning model may be trained as described above with reference to FIGS. 2 and 3.

The liveness detection verifier 840 verifies a liveness detection based on the first determination value (e.g., first probability) and the second determination value (e.g., second probability). For example, the liveness detection verifier 840 verifies the liveness detection based on whether the first prediction value and the second prediction value satisfy one or more conditions. As illustrated in FIG. 6, the liveness detection verifier 840 may perform a combined loss determination based on the first prediction value (e.g., contrastive loss value) and the second prediction value (e.g., CTC loss value) to verify the liveness detection.

As described above, an example of the combined loss determination is shown in FIG. 5. Specifically, the contrastive loss value (L1) obtained from the first machine learning model is compared against a threshold value (e.g., a predetermined margin value (M)). If the contrastive loss is less than the threshold value, the liveness detection verifier 840 determines that the liveness detection is not verified. Further, the CTC loss value (L2) obtained from the second machine learning model is used to predict labels of the recognized speech. If the predicted labels do not correspond to the randomly generated phrase, the liveness detection verifier 840 determines that the liveness detection is not verified. Meanwhile, if both the contrastive loss value is greater than (or greater than or equal to) the threshold value and the predicted labels correspond to the randomly generated phrase, the liveness detection verifier 840 determines that the liveness detection is verified.

The operations of the audio visual similarity detector 820, the speech recognizer 830, and the liveness detection verifier 840 are repeated for each batch of video and audio data obtained from the data preprocessor 810.

It is understood that one or more of the above-described components of the liveness detection verification system 800 may be implemented as circuitry, hardware, software, or a combination of hardware and software. Further, it is understood that one or more of the above-described components of the liveness detection verification system 800 may be implemented as software executable by at least one processor. Moreover, it is understood that one or more of the above-described components of the liveness detection verification system 800 may be distributed across a plurality of devices.

Figure 10:
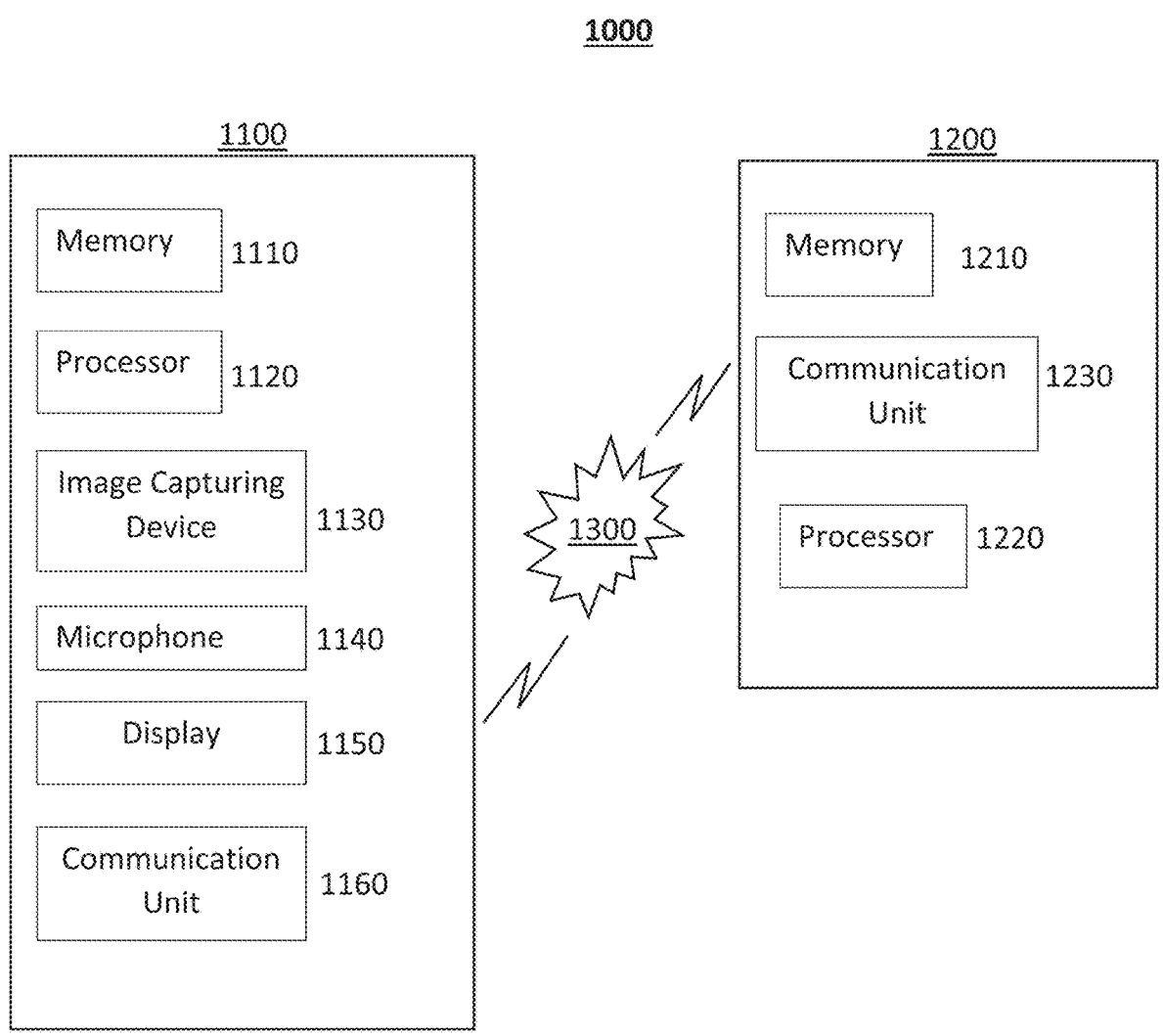
FIG. 10 is a block diagram of an example environment in which systems and/or methods according to one or more embodiments may be implemented.

FIG. 10 is a block diagram of an example environment 1000 in which systems and/or methods according to one or more embodiments may be implemented. As shown in FIG. 10, environment 1000 may include a user device 1100, a platform 1200, and a network 1300. Devices of environment 1000 may interconnect via wired connections, wireless connections, or a combination of wired and wireless connections.

The user device 1100 is a device capable of receiving, generating, storing, processing, and/or providing information associated with platform 1200. For example, the user device 1100 may include a computing device (e.g., a desktop computer, a laptop computer, a tablet computer, a handheld computer, a smart speaker, a server, etc.), a mobile phone (e.g., a smart phone, a radiotelephone, etc.), a portable device (e.g., a portable multimedia player, a navigation device, etc.), a wearable device (e.g., a pair of smart glasses or a smart watch), a terminal device (e.g., customer terminal, automated teller machine, self-checkout terminal or machine, etc.), or a similar device. The user device 1100 may receive information from and/or transmit information to the platform 1200.

In further detail, the user device 1100 may include a memory 1110 and at least one processor 1120 configured to execute instructions (e.g., instructions stored in a non-transitory computer-readable medium of the memory 1110) to perform various operations as described herein. The memory 1110 includes memory space within a single physical storage device or memory space spread across multiple physical storage devices. Software instructions may be read into the memory 1110 from another computer-readable medium or from another device via a communication unit 1160. When executed, software instructions stored in the memory 1110 may cause the at least one processor 1120 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The user device 1100 may further include an image capturing device 1130 (e.g., camera), a microphone 1140, a display 1150, and a communication unit 1160 (e.g., communicator, communication interface, communication circuitry, etc.).

The at least one processor 1120 may control the display 1150 to output a random phrase received from the platform 1200 via the communication unit 1160. According to another embodiment, the at least one processor 1120 may implement at least a portion of the data preprocessor 810 as described above with reference to FIG. 9. For example, the at least one processor 1120 may implement the random phrase generator 920 and generate a random phrase from a vocabulary set as described above (e.g., a vocabulary set stored in the memory 1110, or stored externally).

The at least one processor 1120 may control the image capturing device 1130 and the microphone 1140 to capture a video (combined or corresponding video and audio data). For example, based on the random phrase being output on the display 1150, the at least one processor 1120 may control the image capturing device 1130 and the microphone 1140 to capture a video of a predetermined length (e.g., 3 seconds). Here, the image capturing device 1130 and the microphone 1140 may be controlled to capture the video in response to the random phrase being generated, at a same time that the random phrase is first output on the display 1150, or a predetermined length of time after the random phrase is first output on the display 1150 (e.g., 1 second after the random phrase begins to be output on the display 1150).

Further, the at least one processor 1120 may control the display 1150 to output an indicator to inform a user as to when the video is being captured (e.g., a countdown as to when the video will begin to be captured, a countdown as to when the video will cease to be captured, a symbol, icon, or graphical user interface (GUI) item indicating that the video is being captured, etc.). Additionally, the display 1150 may cease displaying the random phrase based on the capturing of the video, e.g., once the video capturing ceases or a predetermined length of time after the video capturing ceases.

The communication unit 1160 communicates with the platform 1200 via the network 1300. According to an embodiment, the communication unit 1160 transmits the captured video (i.e., combined or corresponding audio and video data) to the platform 1200. According to another embodiment, the at least one processor 1120 may implement at least one of the demultiplexor 940, the video stream processor 950, and the audio stream processor 960 of the data preprocessor 810. In this case, the communication unit 1160 may transmit to the platform 1200 at least one of a processed video stream and a processed audio stream, or at least one of a batch of video frames and a batch of audio frames or spectrograms as described above.

Further, the communication unit 1160 may transmit the randomly generated phrase to the platform 1200 (e.g., where the random phrase is generated by the user device 1100). Of course, where the randomly generated phrase is generated by the platform 1200 and received by the user device 1100 via the communication unit 1160, the communication unit 1160 may not transmit the randomly generated phrase back to the platform 1200. According to another embodiment, where the platform 1200 includes a plurality of devices (e.g., servers), and the randomly generated phrase is received by the user device 1100 from a first device among the plurality of devices, the communication unit 1160 may transmit the randomly generated phrase (as well as the captured video) to a second device among the plurality of devices.

The platform 1200 includes one or more devices that implement all or at least a portion of the liveness detection verification system 800 as described above. In some implementations, the platform 1200 may include a server (e.g., cloud server, web server, authentication server, etc.) or a group of servers. In some implementations, the platform 1200 may be designed to be modular such that certain software components may be swapped in or out depending on a particular need.

As shown in FIG. 10, the platform 1200 includes a memory 1210, at least one processor 1220, and a communication unit 1230 (e.g., communicator, communication interface, communication circuitry, etc.). The memory 1210 includes memory space within a single physical storage device or memory space spread across multiple physical storage devices or servers. Software instructions may be read into the memory 1210 from another computer-readable medium or from another device via a communication unit 1230. When executed, software instructions stored in the memory 1210 may cause the at least one processor 1220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

According to an embodiment, the at least one processor 1220 may control to implement all or at least a portion of the liveness detection verification system 800 described above. For example, the at least one processor 1220 may control to implement at least a portion of the data preprocessor 810. To this end, the memory 1210 may store a vocabulary set and the at least one processor 1220 may randomly generate a phrase therefrom. Further, the at least one processor 1220 may control the communication unit 1230 to transmit the randomly generated phrase to the user device 1100 via the network 1300, and may receive the captured video of the user speaking the randomly generated phrase from the user device 1100 via the network 1300.

The at least one processor 1220 may demultiplex the video into elementary video and audio streams. Additionally, the at least one processor 1220 may control to perform at least one of converting the video stream frame rate to a predetermined frame rate (e.g., 25 frames per second (fps)), extracting a predetermined number of video frames (e.g., 75 video frames corresponding to 3 seconds) such that each frame corresponds to a predetermined length of time (e.g., 40 millisecond video), detecting mouth coordinates for each video frame, cropping the mouth region per the detected coordinates (or bounding box), converting the cropped mouth region to gray scale or a single channel image, and resizing the gray scale or single channel image to a predetermined size (e.g., 60×100 pixels).

Further, the at least one processor 1220 may obtain a predetermined number of batches of a predetermined number of frames of the gray scale or single channel images (e.g., 25 frame batches corresponding to 1 second of data). For example, three batches of 25 frames of video may be output by the video stream processor 950.

The at least one processor 1220 may also process the audio stream. Here, the audio processing may include at least one of converting the audio to a single channel stream, changing a sample frequency to a predetermined frequency (e.g., 22.05 KHz), and extracting a predetermined number of non-overlapping frames (e.g., 75 non-overlapping frames corresponding to 3 seconds) such that each frame corresponds to a predetermined length of time (e.g., 40 millisecond audio). Further, to the extent that the audio processing is for training a machine learning model, the processing may further include tampering the audio frames for input as a negative class of a training dataset (or not tampering for input as a positive class). The tampering may include modifying at least one of a tempo and a pitch of the audio frames.

The audio processing may also include at least one of extracting a mel-scaled spectrogram for each audio frame and converting the spectrograms to gray scale or single channel spectrograms.

Further, the at least one processor 1220 may obtain and output a predetermined number of batches of a predetermined number of frames of the gray scale or single channel spectrograms (e.g., 25 frame batches corresponding to 1 second of data). For example, three batches of 25 frames may be output by the audio stream processor 960.

The at least one processor 1220 may also implement the audio visual similarity detector 820 and the speech recognizer 830 as described above. To this end, the at least one processor 1220 may process the video data (e.g., batches of video frames) and the audio data (e.g., batches of audio frames) and output a first determination value indicating whether the video data (e.g., the mouth movement in the video data) is in synch with the audio. Specifically, the at least one processor 1220 may input the video data and the audio data to a first machine learning model to obtain a first probability that a mouth movement is in synch with the audio (e.g., a probability of a first degree of coincidence between the mouth movement and the audio) for each corresponding batch of the video and audio data.

Additionally, the at least one processor may perform a speech recognition with respect to the audio data to perform a speech recognition and determine whether the random phrase is spoken by the user (e.g., obtains as the second determination value a second probability that the random phrase is spoken by the user). a fully connected layer (or features thereof) of the audio data to the speech recognizer 830.

To this end, the at least one processor 1220 may input a fully connected layer (or features extracted therefrom) of a 3D CNN for the audio data of the first machine learning model into a second machine learning model (e.g., a recurrent neural network, a LSTM network, etc.). The at least one processor 1220 may also control to input labels for a character or word alignment of the randomly generated phrase to the second machine learning model. Here, the labels for the character or word alignment of the randomly generated phrase may be obtained by the at least one processor 1220 for determining a loss (e.g., connectionist temporal classification (CTC) loss). The at least one processor 1220 may generate the labels for the character or word alignment or may obtain the labels another device. Based on these inputs, the second machine learning model may perform a speech recognition to obtain the second determination value (e.g., CTC loss value, as shown in FIGS. 5 and 6).

Moreover, the at least one processor 1220 may control to train the first machine learning model and/or the second machine learning model as described above with reference to FIGS. 2 and 3.

The at least one processor 1220 may also implement the liveness detection verifier 840 as described above, to verify a liveness detection based on the first determination value (e.g., first probability) and the second determination value (e.g., second probability). For example, the at least one processor 1220 may control to verify the liveness detection based on whether the first prediction value and the second prediction value satisfy one or more conditions. In this case, the at least one processor 1220 may perform a combined loss determination based on the first prediction value (e.g., contrastive loss value) and the second prediction value (e.g., CTC loss value) to verify the liveness detection.

The network 1300 includes one or more wired and/or wireless networks. For example, the network 1300 may include at least one of a cellular network (e.g., a fifth generation (5G) network, a long-term evolution (LTE) network, a fourth generation (4G) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 10 are provided as an example. In practice, there may be additional devices and/or networks, fewer devices and/or networks, different devices and/or networks, or differently arranged devices and/or networks than those shown in FIG. 10. Furthermore, two or more devices shown in FIG. 10 may be implemented within a single device, or a single device shown in FIG. 10 may be implemented as multiple, distributed devices. Additionally, or alternatively, a set of devices (e.g., one or more devices) of environment 1000 may perform one or more functions described as being performed by another set of devices of environment 1000.

As set forth above, a liveness detection verification system and method according to embodiments can more reliably and effectively secure biometric authentication and prevent presentation attacks by utilizing a random phrase and a second consistency check (speech recognition) to verify an audio visual liveness detection. For example, by using a random phrase and incorporating a speech recognition to confirm that the phrase is spoken, a user is required to speak in real time thereby precluding use of a previously recorded or tampered video.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs.

Although FIGS. 2-7 shows example blocks of the methods described with reference thereto, in some implementations, the respective methods may include additional blocks, fewer blocks, different blocks, or differently arranged blocks than those depicted. Additionally, or alternatively, two or more of the blocks of the respective methods may be performed in parallel.

The number and arrangement of components shown in FIGS. 8-10 are provided as an example. In practice, the liveness detection verification system 800, the data preprocessor 900, the environment 1000, the user device 1100, and the platform 1200 may include additional components, fewer components, different components, or differently arranged components than those shown in the figures. Additionally, or alternatively, a set of components (e.g., one or more components) of the various devices may perform one or more functions described as being performed by another set of components.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

While the above-described embodiments are with reference to a phrase, it is understood that one or more other embodiments may be applicable to a word, e.g., obtaining a video of a user speaking a word and determining whether the word spoken by the user corresponds to a predetermined word.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

While one or more exemplary embodiments have been described above with reference to the figures, it will be understood by those of ordinary skill in the art that various changes in form and details may be made therein without departing from the spirit and scope as defined at least in part by the following claims.

What is claimed is:

1. A method of verifying a liveness detection by at least one processing device, the method comprising:
   obtaining a video of a user speaking a phrase in response to a question or a randomly generated phrase presented to the user;
   processing the video to obtain video data and audio data of the user;
   inputting the obtained video data and the obtained audio data to a first determination model to obtain a first determination indicative of whether a mouth movement of the user is synchronized with the audio data;
   inputting the obtained video data to a first machine learning neural network, and inputting the obtained audio data to a second machine learning neural network;
   obtaining, as the first determination, a contrastive loss value corresponding to a distance between features from an output of the first machine learning neural network and an output of the second machine learning neural network;
   inputting, to a second determination model, a first input corresponding to the audio data and a second input corresponding to a predetermined phase, to obtain a second determination indicative of whether the phrase spoken by the user corresponds to the predetermined phrase; and
   determining whether the first determination indicates that the mouth movement is synchronized with the audio data and whether the second determination indicates that the predetermined phrase is spoken by the user, to verify the liveness detection of the user.

2. The method of claim 1, further comprising:
   randomly generating, from a pre-stored vocabulary set, the randomly generated phrase for presentation to the user,
   wherein the obtaining the video comprises obtaining the video of the user speaking the phrase in response to the randomly generated phrase being presented,
   wherein the predetermined phrase is the randomly generated phrase,
   wherein the pre-stored vocabulary set comprises predetermined terms for each of a predetermined number of categories, and
   wherein the randomly generated phrase comprises a combination of one term randomly selected from each of the predetermined number of categories.

3. The method of claim 1, wherein the obtaining the video comprises:
   transmitting, to a user device, one of the question and the randomly generated phrase; and
   receiving, from the user device, the video of the user speaking the phrase in response to the one of the question and the randomly generated phrase being presented to the user via the user device.

4. The method of claim 1, wherein the processing the video comprises:
   obtaining, from the video, an audio stream and a video stream;
   obtaining a first predetermined number of batches of a second predetermined number of frames of the video data, the frames of the video data comprising a cropped mouth region generated from the video stream; and
   obtaining the first predetermined number of batches of the second predetermined number of frames of the audio data, the frames of the audio data comprising mel-scaled spectrograms generated from the audio stream.

5. The method of claim 1, wherein the inputting to the second determination model comprises:
   inputting, to a third machine learning neural network, the first input and the second input, the first input being features extracted from the output of the second machine learning neural network, and the second input being a character alignment or a word alignment of the predetermined phrase; and
   obtaining, as the second determination, a connectionist temporal classification (CTC) loss value.

6. The method of claim 5, wherein the determining whether the first determination indicates that the mouth movement is synchronized with the audio data and whether the second determination indicates that the predetermined phrase is spoken by the user comprises:
   determining that the user has not correctly spoken the predetermined phrase based on the contrastive loss value being less than a predetermined threshold;
   determining that the user has not correctly spoken the predetermined phrase based on the predetermined phrase not corresponding to predicted labels obtained from the CTC loss value; and
   determining that the user has correctly spoken the predetermined phrase based on both the contrastive loss value being greater than the predetermined threshold and the predicted labels corresponding to the predetermined phrase.

7. A method of training a liveness detection verification system, the method comprising:
   obtaining a video of a user speaking a phrase;
   processing the video to obtain video data and audio data of the user;
   training a first machine learning model, for detecting audio-visual similarity, and a second machine learning model, for speech recognition, the first machine learning model trained based on the video data and the audio data, and the second machine learning model trained based on a predetermined phrase and a first input corresponding to the audio data, the predetermined phrase corresponding to one of a randomly generated phrase and an answer to a predetermined question;

inputting the obtained video data to a first machine learning neural network, and inputting the obtained audio data to a second machine learning neural network; and obtaining, as the first determination, a contrastive loss value corresponding to a distance between features from an output of the first machine learning neural network and an output of the second machine learning neural network.

8. A liveness detection verification system, comprising:
a memory configured to store instructions; and
at least one processor configured to execute the instructions to:
  obtain a video of a user speaking a phrase in response to a question or a randomly generated phrase presented to the user;
  process the video to obtain video data and audio data of the user;
  input the obtained video data and the obtained audio data to a first determination model to obtain a first determination indicative of whether a mouth movement of the user is synchronized with the audio data;
  input the obtained video data to a first machine learning neural network, and input the obtained audio data to a second machine learning neural network;
  obtain, as the first determination, a contrastive loss value corresponding to a distance between features from an output of the first machine learning neural network and an output of the second machine learning neural network;
  input, to a second determination model, a first input corresponding to the audio data and a second input corresponding to a predetermined phase, to obtain a second determination indicative of whether the phrase spoken by the user corresponds to the predetermined phrase; and
  determine whether the first determination indicates that the mouth movement is synchronized with the audio data and whether the second determination indicates that the predetermined phrase is spoken by the user, to verify the liveness detection of the user.

9. The liveness detection verification system of claim 8, wherein:
the at least one processor is further configured to execute the instructions to randomly generate, from a pre-stored vocabulary set, the randomly generated phrase for presentation to the user;
the obtained video is the video of the user speaking the phrase in response to the randomly generated phrase being presented;
the predetermined phrase is the randomly generated phrase;
the pre-stored vocabulary set comprises predetermined terms for each of a predetermined number of categories; and
the randomly generated phrase comprises a combination of one term randomly selected from each of the predetermined number of categories.

10. The liveness detection verification system of claim 8, further comprising:
a communication interface,
wherein the at least one processor is further configured to execute the instructions to:
  control the communication interface to transmit, to a user device, one of the question and the randomly generated phrase; and
  receive, from the user device via the communication interface, the video of the user speaking the phrase in response to the one of the question and the randomly generated phrase being presented to the user via the user device.

11. The liveness detection verification system of claim 8, wherein the at least one processor is further configured to execute the instructions to:
  obtain, from the video, an audio stream and a video stream;
  obtain a first predetermined number of batches of a second predetermined number of frames of the video data, the frames of the video data comprising a cropped mouth region generated from the video stream; and
  obtain the first predetermined number of batches of the second predetermined number of frames of the audio data, the frames of the audio data comprising mel-scaled spectrograms generated from the audio stream.

12. The liveness detection verification system of claim 8, wherein the at least one processor is further configured to execute the instructions to:
  input, to a third machine learning neural network, the first input and the second input, the first input being features extracted from the output of the second machine learning neural network, and the second input being a character alignment or a word alignment of the predetermined phrase; and
  obtain, as the second determination, a connectionist temporal classification (CTC) loss value.

13. The liveness detection verification system of claim 12, wherein the at least one processor is further configured to execute the instructions to:
  determine that the liveness detection is not verified based on the contrastive loss value being less than a predetermined threshold;
  determine that the liveness detection is not verified based on the predetermined phrase not corresponding to predicted labels obtained from the CTC loss value; and
  determine that the user has correctly spoken the predetermined phrase based on both the contrastive loss value being greater than the predetermined threshold and the predicted labels corresponding to the predetermined phrase.

14. A non-transitory computer-readable medium storing instructions that, when executed by one or more processors, cause the one or more processors to:
  obtain a video of a user speaking a phrase in response to a question or a randomly generated phrase presented to the user;
  process the video to obtain video data and audio data of the user;
  input the obtained video data and the obtained audio data to a first determination model to obtain a first determination indicative of whether a mouth movement of the user is synchronized with the audio data;
  input the obtained video data to a first machine learning neural network, and input the obtained audio data to a second machine learning neural network;
  obtain, as the first determination, a contrastive loss value corresponding to a distance between features from an output of the first machine learning neural network and an output of the second machine learning neural network;
  input, to a second determination model, a first input corresponding to the audio data and a second input corresponding to a predetermined phrase, to obtain a second determination indicative of whether the phrase spoken by the user corresponds to the predetermined phrase; and determine whether the first determination indicates that the mouth movement is synchronized with the audio data and whether the second determination indicates that the predetermined phrase is spoken by the user, to verify a liveness detection of the user.

15. The non-transitory computer-readable medium of claim 14, wherein:

the instructions, when executed by the one or more processors, further cause the one or more processors to randomly generate, from a pre-stored vocabulary set, the randomly generated phrase for presentation to the user;

the obtained video is the video of the user speaking the phrase in response to the randomly generated phrase being presented;

the predetermined phrase is the randomly generated phrase;

the pre-stored vocabulary set comprises predetermined terms for each of a predetermined number of categories; and the randomly generated phrase comprises a combination of one term randomly selected from each of the predetermined number of categories.

16. The non-transitory computer-readable medium of claim 14, wherein the instructions, when executed by the one or more processors, further cause the one or more processors to:

obtain, from the video, an audio stream and a video stream;

obtain a first predetermined number of batches of a second predetermined number of frames of the video data, the frames of the video data comprising a cropped mouth region generated from the video stream; and obtain the first predetermined number of batches of the second predetermined number of frames of the audio data, the frames of the audio data comprising mel-scaled spectrograms generated from the audio stream.

17. The non-transitory computer-readable medium of claim 14, wherein the instructions, when executed by the one or more processors, further cause the one or more processors to:

input, to a third machine learning neural network, the first input and the second input, the first input being features extracted from the output of the second machine learning neural network, and the second input being a character alignment or a word alignment of the predetermined phrase; and obtain, as the second determination, a connectionist temporal classification (CTC) loss value.

18. The non-transitory computer-readable medium of claim 17, wherein the instructions, when executed by the one or more processors, further cause the one or more processors to:

determine that the liveness detection is not verified based on the contrastive loss value being less than a predetermined threshold;

determine that the liveness detection is not verified based on the predetermined phrase not corresponding to predicted labels obtained from the CTC loss value; and determine that the liveness detection is verified based on both the contrastive loss value being greater than the predetermined threshold and the predicted labels corresponding to the predetermined phrase.

19. The method of claim 7, wherein the inputting the first input and the second input to the second machine learning model comprises:

inputting, to a third machine learning neural network, the first input and the second input, the first input being features extracted from the output of the second machine learning neural network and the second input being a character alignment or a word alignment of the predetermined phrase; and obtaining, as the second determination, a connectionist temporal classification (CTC) loss value.

20. The method of claim 7, wherein the training comprises simultaneously training the first machine learning model and the second machine learning model.

21. The method of claim 7, wherein the first input corresponding to the audio data comprises features extracted from a fully connected layer of the first machine learning model.

22. The method of claim 21, wherein the training comprises:

inputting the video data and the audio data to the first machine learning model, to obtain a first determination indicative of whether a mouth movement of the user is synchronized with the audio data;

inputting the first input corresponding to the audio data and a second input corresponding to the predetermined phrase to the second machine learning model, to obtain a second determination indicative of whether the phrase spoken by the user is the predetermined phrase.

23. The method of claim 7, wherein the training comprises:

inputting the video data and the audio data to the first machine learning model, to obtain a first determination indicative of whether a mouth movement of the user is synchronized with the audio data;

inputting the first input corresponding to the audio data a second input corresponding to the predetermined phrase to the second machine learning model, to obtain a second determination indicative of whether the phrase spoken by the user is the predetermined phrase;

aggregating the first determination and the second determination; and training the first machine learning model and the second machine learning model based on the aggregated determination.

\* \* \* \* \*

UNITED STATES PATENT AND TRADEMARK OFFICE
CERTIFICATE OF CORRECTION

PATENT NO. : 12,039,024 B2
APPLICATION NO. : 17/312762
DATED : July 16, 2024
INVENTOR(S) : Pankaj Wasnik and Yeongnam Chae It is certified that error appears in the above-identified patent and that said Letters Patent is hereby corrected as shown below:

On the Title Page

(73) Assignee
Please replace "Rakuten, Inc.," with --Rakuten Group, Inc.--

Signed and Sealed this
Twentieth Day of August, 2024

Katherine Kelly Vidal
*Director of the United States Patent and Trademark Office*